Figure 1:
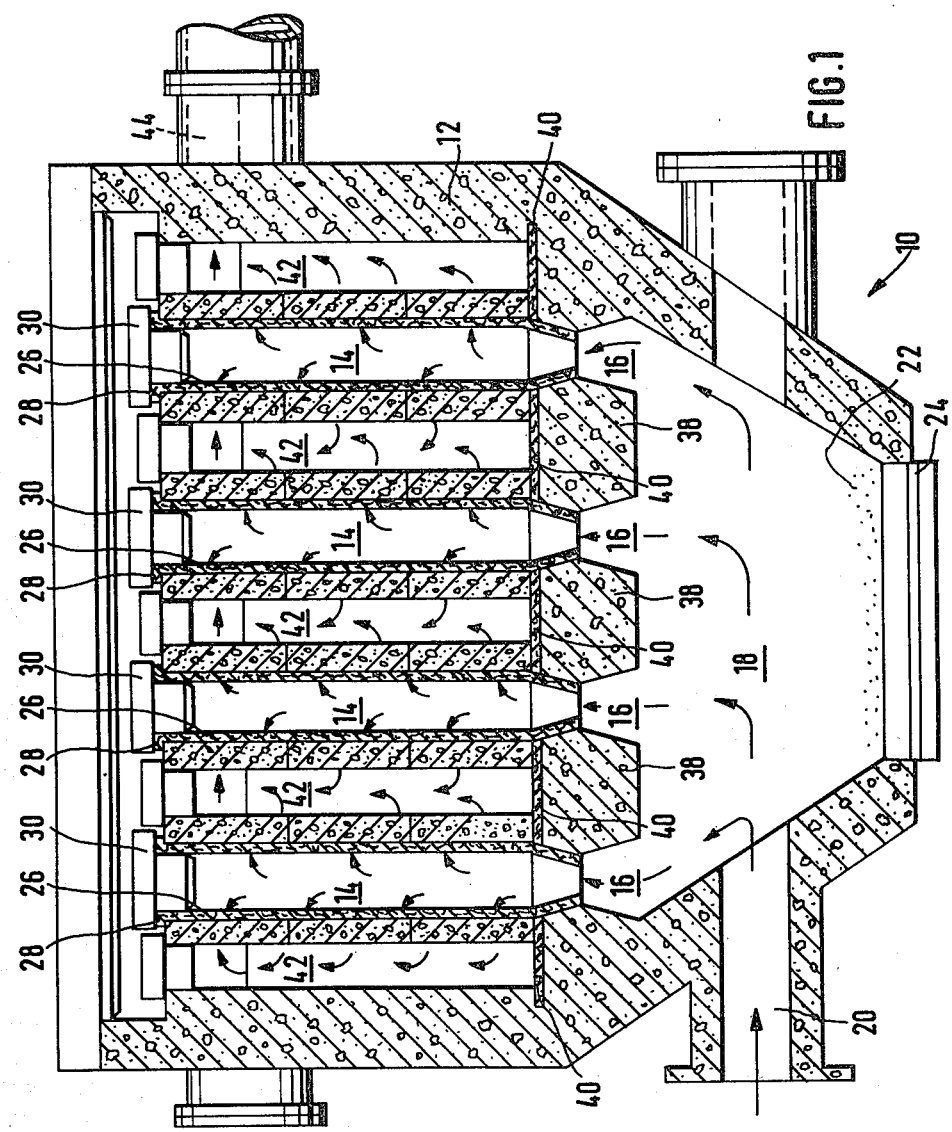

United States Patent [19]
Fetzer

[11] 4,342,574
[45] Aug. 3, 1982

[54] HOT GAS FILTER

[75] Inventor: Wolfgang Fetzer, Mühlhausen, Fed. Rep. of Germany

[73] Assignee: Kraftanlagen AG, Heidelberg, Fed. Rep. of Germany

[21] Appl. No.: 179,835

[22] Filed: Aug. 20, 1980

[30] Foreign Application Priority Data

Sep. 3, 1979 [DE] Fed. Rep. of Germany ....... 2935564

[51] Int. Cl.³ ...................... B01D 29/14; B01D 39/20; B01D 46/02
[52] U.S. Cl. .................................. 55/341 M; 55/350; 55/378; 55/382; 55/484; 55/486; 55/502; 55/522; 55/523; 55/DIG. 9; 55/DIG. 45; 55/524
[58] Field of Search ................. 55/350, 374, 378, 381, 55/382, 432, 484, 486, 502, 522, 523, 524, DIG. 9, DIG. 45, 341 M, 341 MC, 341 PC

[56] References Cited

U.S. PATENT DOCUMENTS

| | | | |
|---|---|---|---|
| 515,767 | 3/1894 | Harmon | 55/350 |
| 994,282 | 6/1911 | Spilsbury | 55/484 |
| 2,079,315 | 5/1937 | Dickerson | 55/381 |
| 3,139,326 | 6/1964 | Costello | 55/522 |
| 3,505,790 | 4/1970 | Rothemich | 55/432 |

FOREIGN PATENT DOCUMENTS 1476481  6/1977  United Kingdom .................. 55/524

OTHER PUBLICATIONS

Jones, Idris, High Temperature Resistant Fibres from Organic, Polymeric Precursors, 4/29/1969, Plastics Infiltration, pp. 303, 306–309.

Primary Examiner—David L. Lacey

[57] ABSTRACT

Hot gas filter for separating solid particles carried along in high temperature or waste gases having a filter casing made of heat-resistant brickwork, in which there is provided at least one oblong filter cell one end of which ends in a hot gas supply duct whereas the other end is tightly closed by a removable cover. The walls of the filter cell are at least partly made of perforated bricks, through which the hot gas entering the filter cell may overflow to a treated gas discharge duct. The filter cell is lined over the whole length thereof with a replaceable filter hose of heat resistant fabric or tissue, preferably non-woven ceramic fiber fabric or a fabric of ytrium-oxide stabilized zircon-oxide fibers.

17 Claims, 3 Drawing Figures

HOT GAS FILTER

BACKGROUND OF THE INVENTION

The invention relates to a hot gas filter for separating solid matter carried along in high temperature gases and waste gases.

The hot flue gases produced in incinerators contain considerable amounts of suspended solid matter which must not be released into the atmosphere. This applies above all to incinerators in which radioactively, biologically and bacterially contaminated waste material is burnt. It is therefore recommended to ensure treatment of the hot flue gases immediately after they leave the incinerator in order to avoid fouling or contamination of the waste gas system. However, the flue gases leave the incinerators at temperatures ranging between 700 and 1000 degrees centigrade and it is therefore rather difficult to develop filters which ensure a high filtering effect, low draft losses, a sufficiently long service life and which can easily be reactivated. In nuclear process engineering, several approaches have been made to solve this problem by using filter cartridges made of burnt, porous ceramic material in the form of long cylinders, with one end being closed and the other end open for admission of the hot flue gases to be treated and provided on the open end of the cylinder with a radially projecting flange for holding the filter cartridges which are inserted in the openings of a sieve bottom. However, sealing of the filter cartridges in the sieve bottom gave rise to various problems due to the fact that the sieve bottom and the openings change their dimensions with rising temperatures, which means that particularly in case of differing thermal expansion coefficients for sieve bottom material and the ceramic material of the filter cartridges, gaps and passages may form through which untreated flue gases may penetrate if no special sealing such as asbestos cords etc. is provided. It is evident that draft losses, i.e. unintended pressure drops, in such filter cartridges are considerable and therefore high-capacity waste gas fans are required in the waste gas system. Furthermore, the removal of solid particles retained inside the porous wall, renders cleaning and regeneration of the filter cartridges rather difficult and worn-out filter cartridges must be crushed and the remaining parts are still of relatively high weight. Last but not least, these filter cartridges are, especially in the proximity of the radial flanges, highly sensitive to mechanical stresses and strains. For the above specified reasons, the need for an improved hot gas filter wherein the above problems are solved, is very urgent.

THE INVENTION

The invention therefore relates to a filter for separating solid particles carried along in hot gases or flue gases, ensuring a high filtering effect, low draft losses and a sufficiently long service life, and permitting at the same time easy and quick regeneration without any risks for the operating personnel.

This is accomplished by means of at least one oblong filter cell of heat resistant brickwork housed in a filter case; the one end of the filter cell ending in a hot gas supply duct in the filter case whereas the other end is tightly closed by means of a removable cover element, and wherein at least part of the walls of the filter cell is made of perforated bricks through which the hot gases entering the filter cell pass into a treated gas discharge duct by penetrating through a filter hose of heat resistant fiber fabric or tissue applied to the filter cell over its total length. Contrary to the brittle ceramic filter cartridges, the proposed filter material of heat resistant fabric or tissue easily withstands any impact or shock. The use of this type of filter material in the form of a hose being open at its admission end, only, ensures that the hot gases entering the filter cell have in any case to penetrate the filter hose before they leave the filter cell, and by-passing of the filter material via possibly existing cracks or gaps in the brickwork is in this way prevented.

In addition, installation, fastening and sealing of this filter material is considerably facilitated compared to ceramic filter cartridges, due to the fact that the filter hose itself may be used for sealing and the hose material easily compensates thermal expansion. Further advantages are the comparably low prices for the filter hose material and the reduced waste volume and weight of worn-out filter hoses.

The filter cell(s) is (are) preferably vertically disposed and the hot gas supply duct(s) ends (end) in the bottom end of the pertaining filter cell. This implies that the filter hose is suspended inside the filter cell and provides, with the aid of the induced-draught fans connected ahead of the waste gas system, a uniform lining on the filter cell walls.

Since the filter case is built of high-temperature resisting material in order to ensure maximum heat resistance and to better withstand corrosion which may be caused by aggressive acids etc. forming during shut-down periods inside the filter from aggressive constituents of the heating gases and air humidity, it is recommended to design the fillter cell(s) with rectangular cross section wherein the longer walls of the rectangular filter cell(s) are made of perforated brickstones. Although any oblong filter of any cross section may, in principle, be used, a filter cell of rectangular cross section can best be made of brickwork.

In this case, too, it is recommended not to integrate the perforated brickstones into the brickwork of the filter case but to insert them into slots provided for in the brickwork of the filter case. In this way the perforated brickstones may easily be removed or replaced, if required. The use of an all-around closed filter hose ensures that no untreated hot gases leak through the gap between slot and perforated bricks.

In order to ensure hot gas admission to the greatest possible part of the filter hose, it is recommended to provide the perforated bricks on that side which points to the filter cell, with a pattern of grooves running from hole to hole. Hot gas admission to the filter hose is then not only ensured directly at the holes of the perforated bricks but also from the grooved sections.

The bottom end of the filter cell(s) shall preferably be slightly tapered towards the flow direction of the supplied hot gases. This also permits to press the filter hose against the filter case walls by means of an appropriately ring-shaped tension element. In this way, any leakages of unfiltered hot gases at the front end of the filter hose are avoided.

It is recommended to use a tension element made of high-temperature resisting ceramic material of a thermal expansion coefficient corresponding to that of the surrounding brickwork. In this way, any damage which otherwise could be caused for example by metal tension elements which as a consequence of their higher thermal expansion coefficient could damage the surrounding section of the filter case, is avoided.

Apart from the tapered admission end of the filter cell, it is also possible to design the filter cell(s) in such a way that the cross section remains unchanged over the total length and that the transition of the admission end of the filter cell into the pertaining hot gas supply duct is stepped, and the admission end of the filter hose introduced into the filter cell rests on the transition step.

The preferred embodiment of the invention provides for a filter hose which is longer than the corresponding filter cell. After insertion of the filter hose into the filter cell, the projecting top end of the filter hose is folded back onto the filter case and is then held by means of the projecting flanges of the heat resisting sealing brick which serves as cover. Easy and quick access to the filter cell is ensured by simply removing the sealing brick, at the same time, the projecting and folded-back end of the filter hose prevents untreated hot gases from leaving the closed end of the filter cell.

With regard to the oblong form of the filter cell, mounting of the flexible filter hose could possibly give rise to problems. In the present invention this problem is solved by applying the filter hose, for mounting purposes, to a cartridge case which is open on both ends and corresponding in form and size exactly to the pertaining filter cell and being made of rigid cardboard material or the like which burns with practically no residues.

The filter hose applied to the cartridge case forms in this way a rigid and self-sustained filter cartridge which can easily be mounted. After mounting, as soon as the filter is put into operation, the cardboard material forming the filter cartridge burns and the remaining filter hose operates at full efficiency within a short time.

It is recommended to provide a perforated material for the cartridge case in order to ensure a better gas flow in the filter cell right from the beginning and to accelerate in this way the incineration of the cartridge case.

If there are several parallelly disposed filter cells provided in the filter case, it is recommended to place them in such a way that a treated gas duct is running between two neighboring filter cells, each; these treated gas ducts shall then end in a common treated gas discharge duct.

On the admission side, the filter cells may also end in a common hot gas distribution chamber, the bottom of the latter being designed as an ash trap for collecting all residues from the filter cells and being provided with a discharge flap for intermittent opening and closing.

In the event that contaminated residues must be expected, the discharge flap shall be executed as a discharge lock to which the drums for transport and storage of the residues are coupled in such a way that hermetical sealing is ensured and the operating personnel does not come into contact with the waste material. After the specified service time of the filter hoses has elapsed resulting in a reduced filtering effect, the filter hoses are simply pushed-out at the admission side of the filter cell by removing the sealing brick and are then discharged via the ash trap.

Particularly in the event that the solid matter to be filtered-out is radioactively contaminated, this preferred embodiment of the invention permits a safe change of the filter hoses by simply discharging the worn-out filter hoses through the filter cell directly into the drum which is hermetically coupled to the filter case. In this way contaminated residues or parts of the filter hose cannot be released into the atmosphere during filter hose replacement.

After long operating cycles, cracks in the brickwork of the filter case may occur which are attributable to thermal expansion. In order to prevent untreated hot gases from penetrating through these cracks from the hot gas admission side to the discharge side, it is recommended to provide the brickwork of the filter case between hot gas side and treated gas side with filter mats made preferably of the same material as the filter hoses which due to its high flexibility is insensitive to any cracks.

The filter hose is preferably made of ceramic fiber fabric which is sufficiently heat resistant within the expected temperature range and which also guarantees, particularly if long ceramic fibers are used, the required service time.

Alternatively, the filter hose may also be made of zircon-oxide fiber fabric stabilized with yttrium oxide. Heat resistance and service life of this fabric is considerably higher than that of ceramic fiber fabric. However the price of this material is considerably higher, too.

Figure 2:
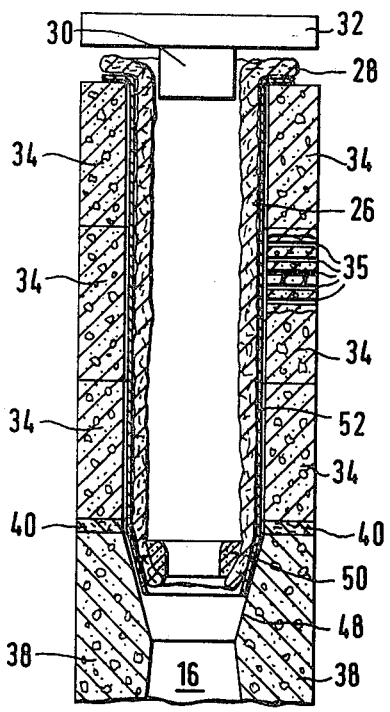
Figure 3:
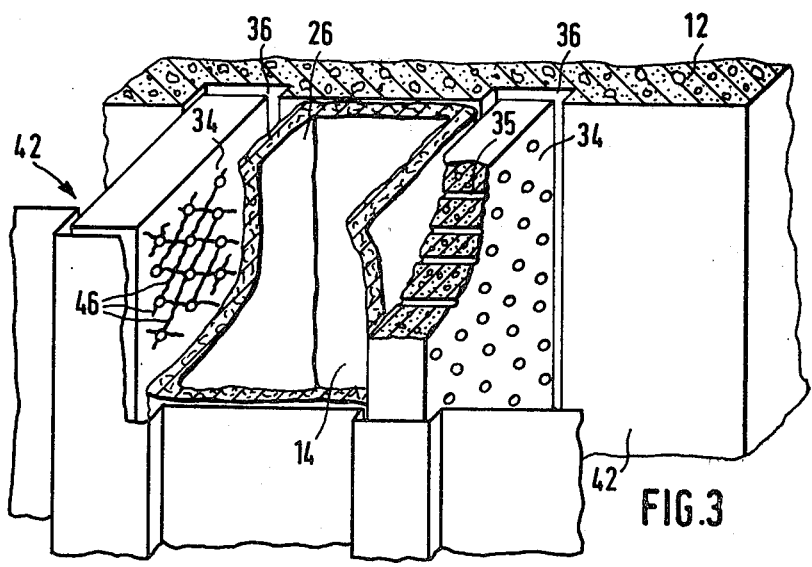

The filter according to the invention will now be described with reference to the embodiment illustrated in the accompanying drawings, wherein:

FIG. 1: is a schematic representation of a section through the hot gas filter according to the invention;

FIG. 2: is a sectional view of a filter cell of the hot gas filter according to FIG. 1, however drawn on a larger scale;

FIG. 3: is a perspective view of a part of a filter cell of the hot gas filter according to the invention.

The hot gas filter (10) shown in the drawing comprises a filter case (12) made of high temperature resisting brickwork, with several, in the shown embodiment four, vertical, oblong filter cells (14) disposed parallely at equal distances inside the filter case and being connected at their bottom ends via hot gas supply ducts (16) in the filter case to a common hot gas distribution chamber (18) into which the hot gases originating from an incinerator or reactor are led through a supply duct (20). The tapered bottom end of the hot gas distribution chamber (18) is designed as an ash trap of the filter (10) for collecting the residues (22) consisting of filtered-out solid matter and other residues originating from the filter cells (14).

Discharging of the residues (22) is effected by means of an intermittently opening and closing discharge flap (24) which, contrary to the schematic presentation in FIG. 1, may also be designed as a transfer lock to which waste drums are coupled before opening of the flap and ensuring a hermetical seal in order to prevent the release of contaminated filter residues from the hot gas filter (10).

The filter cells (14) are lined over their total length with a filter hose (26) made of ceramic fiber fabric or other high temperature resisting fabric. The top ends of the filter hoses due to the fact that they are longer than the filter cells, can therefore be folded back onto the surrounding walls. A sealing brick (30) partly introduced into the filter cell, holds with the projecting margins of a cover flange (32) the folded-back top ends (28) of the filter hose, ensuring in this way also the hermetical sealing of the filter cells.

As most clearly shown in FIG. 3, the filter cells (14) are of rectangular cross section and the walls forming the longer sides of the rectangle are built of perforated brickstone (34) with multiple holes (35). The brick stones (34) are inserted in vertically running slots (36) in the brickwork of the filter case (12), permitting their quick and easy replacement in case of eventual damage. The bottom brickstones (34) rest on transverse walls (38) of the filter case (12), an intermediate layer 40 of filter material being inserted in between. The perforated brickstones (34) form with their outside walls the treated gas ducts (42) which run parallelly to the filter cells (14) and which end in a common treated gas duct (44) (not directly shown on the drawing) through which the treated gases are conveyed to the subsequent stations of the waste gas system. In order to ensure a better hot gas admission to the filter hoses (26) the wall sides of the perforated bricks (34) pointing to the filter hoses (26) shall be provided with a grid-like pattern of grooves (46) running from hole to hole (35) (FIG. 3).

The bottom end i.e. the admission end (48) of each filter cell is slightly tapered towards the direction of flow and the filter hose is in this section closely fitted to the surrounding walls. In addition, a correspondingly shaped ring tension element (50) is introduced into the filter hose (26) which due to its proper weight presses the bottom end of the filter hose against the surrounding walls. This tension element (50) is made of heat resistant ceramic material of the same thermal expansion coefficient as the surrounding material of the filter case (12) in order to avoid any damage to the filter case or to the tension element due to differing thermal expansion coefficients.

In order to facilitate mounting of the filter hoses (26) particularly to avoid their sticking to the walls of filter cells (14), the filter hoses are glued, for mounting purposes, to a filter cartridge (52) made of cardboard and corresponding in form and size exactly to the filter cells (14). The cardboard material used for the cartridge case (52) shall be perforated and shall burn with practically no residues at the temperatures prevailing in the filter. In addition, the removal of worn-out filter hoses is considerably facilitated by simply lifting the sealing brick (30) and pushing-down the filter hose by means of suitable tools through the hot gas supply duct (16) into the hot gas distribution chamber and ash trap respectively. Quick and easy filter hose change and maintenance of the hot gas filter according to the invention is in this way ensured. It is evident that within the spirit of the invention the described embodiment of the invention may be subject to modifications and further development. Such modifications may, for example, relate to the number, the cross section and the disposition of the filter cells inside the filter case.

Apart from the specified ceramic fiber fabric, the filter hoses may also be made of zircon-oxide fiber fabric stabilized with yttrium oxide, which guarantees a considerably higher service life, the costs, however, being considerably higher, too. Due to the described easy and quick method of changing the filter hoses, up till now the specified ceramic fiber fabric has been preferred to any other material.

I claim:

1. Hot gas filter for separating solid particles from high temperature gases or waste gases, comprising: a filter case made of heat-resistant brick-work, at least one oblong filter cell housed in said filter case, said case comprising a hot gas supply duct and means for connecting one end of said at least one filter cell with said hot gas supply duct, the other end of said at least one filter cell being tightly closed by a removable cover, said at least one filter cell having walls at least partly made of bricks with perforations, at least one replaceable filter hose of heat resistant fabric or tissue lining the walls of said at least one filter cell, and clean gas receiving means outside said at least one cell in said filter case for receiving hot gases passed through said at least one filter hose and said at least one filter cell and clean gas outlet means communicating with said receiving means for exhausting clean gas from said case 2. Hot gas filter according to claim 1, wherein said at least one filter cell is disposed vertically in the filter case and wherein the connecting means is connected to the bottom end of said at least one filter cell.

3. Hot gas filter according to claim 1, wherein said at least one filter cell is of rectangular cross section and wherein the walls of said at least one filter cell formed by the longer sides of the rectangle are made of said bricks with perforations.

4. Hot gas filter according to claim 3, wherein the bricks with perforations are placed in slots in the brickwork of the filter case.

5. Hot gas filter according to claim 4, wherein the bricks are provided where they face said at least one filter cell with a pattern of grooves running from perforation to perforation.

6. Hot gas filter according to claim 1, wherein the bottom end of said at least one filter cell is slightly tapered towards the connecting means.

7. Hot gas filter according to claim 6, wherein said at least one filter hose in the tapered bottom end of said at least one filter cell is pressed against the walls of said at least one filter cell by a suitably shaped circular tension element.

8. Hot gas filter according to claim 7, wherein the tension element is made of heat resistant ceramic material.

9. Hot gas filter according to claim 1, wherein said at least one filter cell is of equal cross section over a major portion of its total length and wherein said connecting means has a transition zone shaped in such a way that the end of said at least one filter hose introduced into said at least one filter cell rests on the transition zone.

10. Hot gas filter according to claim 1, wherein said at least one filter hose is longer than said at least one filter cell and wherein one end of said at least one filter hose is folded back on the filter case and is held by a projecting cover flange of a heat resistant sealing brick serving as said cover.

11. Hot gas filter according to claim 10, wherein said at least one filter hose is glued, for mounting purposes, to the inside of an open cartridge case which corresponds in form and size to the said at least one filter cell; the cartridge being made of cardboard or similar rigid material which burns with practically no combustion residues.

12. Hot gas filter according to claim 11 wherein the cartridge case material is perforated.

13. Hot gas filter according to claim 1, wherein said at least one filter cell comprises a plurality of filter cells connected and disposed parallelly to each other inside the filter case and wherein said clean gas receiving means includes treated gas ducts which are connected to a common treated gas discharge duct defining said clean gas outlet means and said treated gas ducts are provided between neighboring said filter cells.

14. Hot gas filter according to claim 2 or 13, wherein said connecting means includes a hot gas distribution chamber with a bottom designed as an ash trap for collecting residues originating from said at least one filter cell; and being provided with a discharge flap for intermittent opening and closing and thereby discharging the residues.

15. Hot gas filter according to claim 1, comprising intermediate filter layers provided in the brickwork of the filter case between said connecting and said receiving means for preventing the penetration of unfiltered hot gases through cracks or other openings in the brickwork.

16. Hot gas filter according to claim 1, wherein said at least one filter hose is made of non-woven fabric of ceramic fibers.

17. Hot gas filter according to claim 1, wherein said at least one filter hose is made of a fabric of zircon-oxide fibers stabilized with yttrium-oxide.

* * * * *